(12) United States Patent
Vanderhallen et al.

(10) Patent No.: US 10,078,419 B2
(45) Date of Patent: Sep. 18, 2018

(54) METHOD FOR OPERATING A UNIVERSAL PLUG AND PLAY AV SYSTEM, RESPECTIVE SYSTEM AND CONTROL DEVICE

(71) Applicant: THOMSON LICENSING, Issy de Moulineaux (FR)

(72) Inventors: Frank Vanderhallen, Lanaken (BE); Dominique Chanet, Aalst (BE); Guy Frederix, Gullegem (BE); Kristl Haesaerts, Melsbroeck (BE)

( * ) Notice: Subject to any disclaimer, the term of this patent is extended or adjusted under 35 U.S.C. 154(b) by 359 days.

(21) Appl. No.: 14/366,410

(22) PCT Filed: Dec. 17, 2012

(86) PCT No.: PCT/EP2012/075710
§ 371 (c)(1),
(2) Date: Jun. 18, 2014

(87) PCT Pub. No.: WO2013/092459
PCT Pub. Date: Jun. 27, 2013

(65) Prior Publication Data
US 2015/0006779 A1   Jan. 1, 2015

(30) Foreign Application Priority Data

Dec. 19, 2011   (EP) .................................. 11306695

(51) Int. Cl.
| | | |
|---|---|---|
| *G06F 3/0481* | (2013.01) | |
| *H04N 21/436* | (2011.01) | |
| *H04L 12/28* | (2006.01) | |
| *G06F 3/0482* | (2013.01) | |
| *G06F 3/0484* | (2013.01) | |
| *G06F 13/42* | (2006.01) | |

(52) U.S. Cl.
CPC ........ *G06F 3/04817* (2013.01); *G06F 3/0482* (2013.01); *G06F 3/04847* (2013.01);
(Continued)

(58) Field of Classification Search
CPC .............. G06F 3/0482; G06F 3/04817; G06F 3/04847; G06F 13/426; H04N 21/43615;
(Continued)

(56) References Cited

U.S. PATENT DOCUMENTS 7,020,573 B2 *   3/2006   Wheeler ............. H04L 12/2697
                                                702/117
7,234,014 B2     6/2007   Molander et al.
(Continued)

OTHER PUBLICATIONS

Anonymous, "How to Eject a Stuck Floppy Disk on a Mac", http://www.ehow.com/how_6528_eject-stuck-floppy.html/, Dec. 30, 2010, pp. 1-3.
(Continued)

*Primary Examiner* — Ernest Unelus (57) ABSTRACT

The method relates to a Universal Plug and Play AV system, which comprises a media server included in a server device having a digital interface, to which a removable storage device is coupled, a media renderer included in a display device and a control point included in a control device for controlling the server device and the display device via Universal Plug and Play AV actions. The method comprises the steps of arranging an unmount icon in the display of the control device, unmounting the storage device in case said unmount icon is operated, and providing a feedback on the display device and/or the control device after said unmount action was performed on the server device.

9 Claims, 4 Drawing Sheets

(52) U.S. Cl.
CPC .......... *G06F 13/426* (2013.01); *H04L 12/282* (2013.01); *H04N 21/43615* (2013.01); *H04L 2012/2849* (2013.01)

(58) Field of Classification Search
CPC ............ H04N 5/76; H04N 5/765; H04N 5/64; H04N 5/781; H04N 5/85; H04N 21/4135; H04L 2012/2849
See application file for complete search history.

(56) References Cited

U.S. PATENT DOCUMENTS

2006/0200570 A1    9/2006  Stirbu et al.
2008/0253747 A1   10/2008  Miyazaki et al.

OTHER PUBLICATIONS

Anonymous, "Mount/Unmount USB drives with VBSCript", http://stackoverflow.com/questions/296560/mount-unmount-usb-drives-with-vbscript/, Dec. 30, 2010, pp. 1-2.
Kang et al., "Design of UPnP-based Ubiquitous Virtual Storage", Conference on Embedded Systems and Applications, Las Vegas, Nevada, USA, Jun. 25, 2007, pp. 155-158.
Grantemsley: "How to safely remove USB drive from batch file", Jan. 22, 2006, pp. 1-15.
Richie et al: "UPnP AV Architecture:2 for UPnP Version 1.0", Dec. 31, 2010, pp. 1-30.
Steven Sinofsky: "Media streaming with Windows 7", May 12, 2009.
Search Report Dated Mar. 4, 2013.

\* cited by examiner

METHOD FOR OPERATING A UNIVERSAL PLUG AND PLAY AV SYSTEM, RESPECTIVE SYSTEM AND CONTROL DEVICE

This application claims the benefit, under 35 U.S.C. § 365 of International Application PCT/EP2012/075710, filed Dec. 17, 2012, which was published in accordance with PCT Article 21(2) on Jun. 27, 2013 in English and which claims the benefit of European patent application No. 11306695.5, filed Dec. 19, 2011.

TECHNICAL FIELD

The present invention relates to a Universal Plug and Play AV system comprising a media server, a media renderer and a control point for controlling the media server and the media renderer and for providing defined actions for rendering pictures, music and videos via Universal Plug and Play AV actions.

BACKGROUND OF THE INVENTION

USB (Universal Serial Bus) and Firewire, IEEE 1394, are standard digital interfaces for connecting devices to a personal computer. These interfaces are hot-pluggable, which means that devices can be plugged in and unplugged from the interface without rebooting the personal computer, and connected devices are automatically recognized by the personal computer, which is described as "Plug and Play". One class of available USB or Firewire devices are storage devices like hard disks, memory sticks or other flash memory devices. USB and Firewire storage devices should always be unmounted before they are disconnected from the interface to avoid any data loss during a not finished operation. However, the USB and the Firewire interface have no mechanism to prevent users from disconnecting a storage device which is still mounted. In most user scenarios, the unmount action has to be triggered by the end user. Therefore, performing this unmount action should be as less cumbersome as possible.

An extension of "Plug and Play" is UPnP, "Universal Plug and Play", which is defined by an International Standard, ISO/IEC 29341. UPnP defines control points which are devices using UPnP protocols to control UPnP devices and defines actions for rendering pictures, music and videos. Although a control point can manage multiple UPnP devices, all interactions occur in isolation between the control point and each UPnP device. The individual UPnP devices do not interact directly with each another. In particular residential gateways usually include a UPnP architecture to allow device-to-device networking with personal computers, networked home appliances, removable storage devices or other consumer electronics devices.

An audio and video extension of UPnP is UPnP AV (UPnP for Audio/Video), which allows a higher level of interoperability between UPnP devices. UPnP AV allows to deliver streaming media, for example real-time audio/video streams, for which it is critical to be delivered within a specific time, or the stream is interrupted. The current UPnP AV v2 specification is defined by the UPnP Forum, which is a group of companies and individuals across multiple industries that play a leading role in the authoring of specifications for UPnP devices and services.

Figure 1:
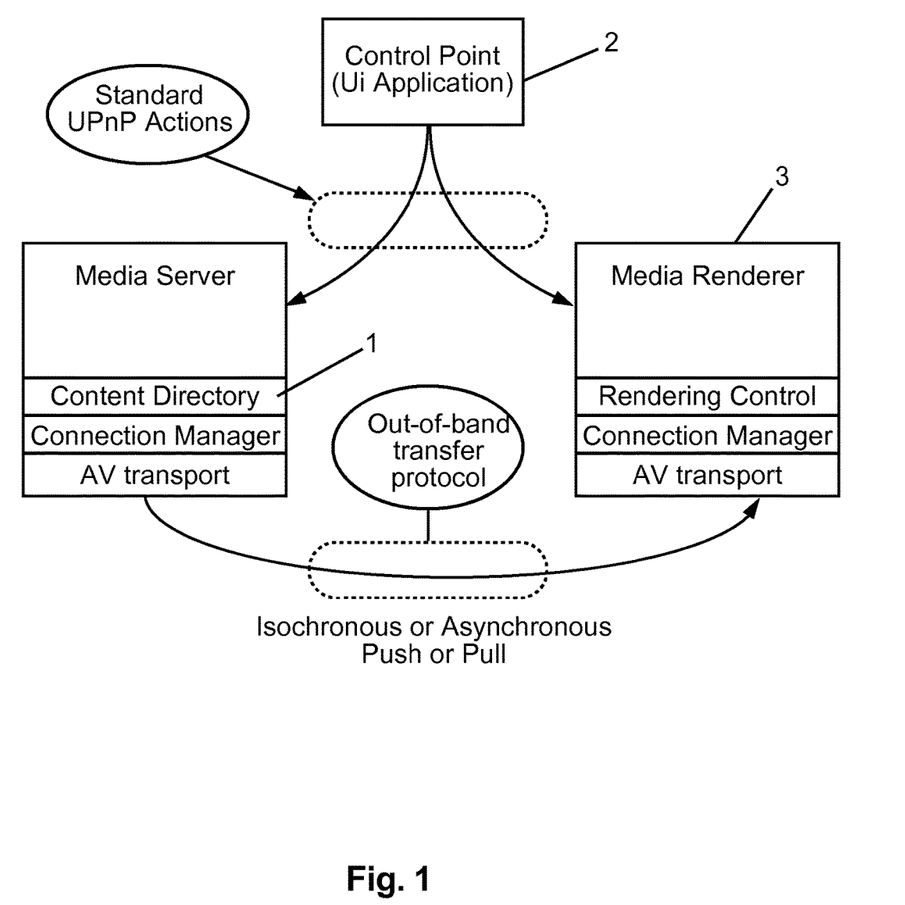
FIG. 1 a generic UPnP AV system including a media server, a control point and a media renderer, FIG. 2 a UPnP AV system including a residential gateway as the media server, to which two removable storage devices are coupled, FIG. 3 the UPnP AV system as shown in FIG. 2 illustrating an unmount operation for one of the removable storage devices according to prior art, and FIG. 4 illustrating an unmount operation according to the invention for one of the removable storage devices of a UPnP AV system as shown in FIG. 2.

UPnP AV defines three services: a media server for serving media content, a media renderer capable of playing one or more media formats, and a control point for controlling the media server and the media renderer. An environment with a UPnP AV media server 1, a control point 2 and a media renderer 3 is shown in FIG. 1, wherein the media server, the media renderer and the control point are separate devices according to a 3-Box model. The media server 1 may have for example a USB or Firewire digital interface, via which a removable storage device containing audio/video media can be connected to the media server 1. The control point 2 coordinates the operation of the media server 1 and the media renderer 3 to achieve an overall, synchronized end-user effect. The media server 1 and the media renderer 3 do not interact directly with each another, all of the coordination between the two devices is performed by the control point 2.

Figure 2:
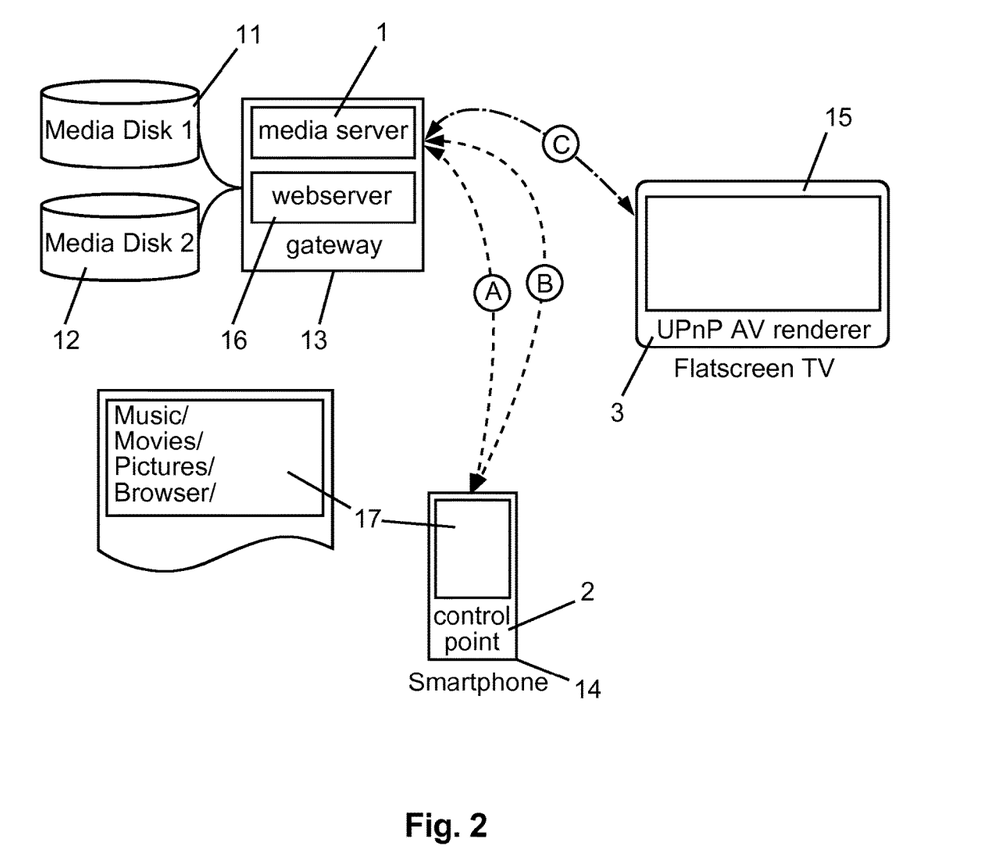

In FIG. 2 a situation is shown wherein the media server 1 is implemented in a residential gateway 13, to which two USB storage disks 11, 12 are attached. On a smartphone 14 an UPnP AV control point application has been installed, so that the smartphone 14 can operate as a control point 2 as described with regard to FIG. 1. The media renderer 3 is a flat-screen TV 15, which is capable of playing movies, music and pictures. The residential gateway 13 comprises a webserver 16 for providing Internet services, which webserver includes a webpage as a user interface to be used by a user for configuring the residential gateway 13. The user browses through the media file collection on the media server 1 by making use of the control point software of his smartphone 14.

The media files are organized in a hierarchy of file containers, which is similar to a file system organizing files in directories, which can be displayed in a display 17 of the smartphone 14. The file containers are arranged for example in a root container or root container of the smartphone 14, and for each media category "music", "movies" and "pictures" advantageously a dedicated file container is provided. The user can navigate with the smartphone 14 through the media just like with a file system explorer. When the user selects a media file on the media server 1 to play, step A, a play action message is send from the smartphone 14 to the media server 1, step B. The media server 1 acts on the play message by streaming the selected media file towards the media renderer 3, step C.

Now, the user wants to disconnect one of the storage disks 11, 12. Before disconnecting a disk, the user has to unmount the disk in order to avoid file system corruption. However, the UPnP AV specification does not define an action for unmounting of disks. Therefore, manufacturers of media servers with support for external disks implement a proprietary solution for unmounting of external disks.

Figure 3:
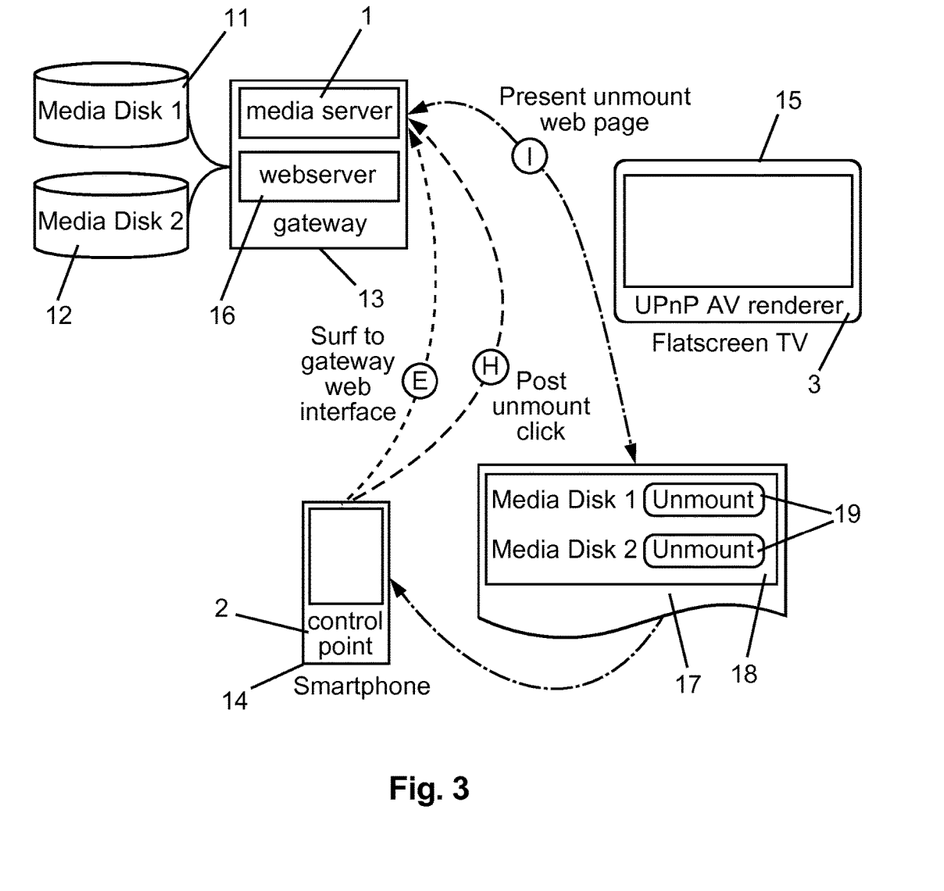

In FIG. 3, an unmount method available in many media servers, including residential gateways, is illustrated. The webserver 16 has a webpage 18, dedicated for unmounting of external storage devices. For unmounting one of the storage disks 11, 12, the user has to perform the following steps:

the user has to open a web browser on the controlling device, i.e. the smartphone 14 as the control point 2, step D, the user has to surf to the web interface of the media server 1, step E, so he has to know the IP address of the media server 1, the user usually needs to enter a login and/or a password to gain access to the web pages of the media server 1, step F, the user should know on which web page: web page 18, the unmount buttons 19 are located, which may not be obvious for a novice user, and The user has to surf to the webpage 18, step G, click on the web page 18, step H, so that the web page 18 opens on the display 17 of the smart phone 14, step I, and to click on one of the unmount buttons 19, step J.

This method for unmounting a disk in an UPnP AV environment is therefore not user friendly. It is also noted that a web browser is not per definition available on a control point: instead of a smartphone, also any other possible control point device, for example a dedicated remote control unit without a web browser, may be used. The necessity to start another application and having to know technical details, like the IP address of the media server 1, are against the plug and play philosophy of the UPnP protocol. Since it is so cumbersome in an UPnP AV environment to unmount a disk with this method, it is not uncommon that many users will not use this method, and disconnect a disk without unmounting it. This will almost certainly lead to file system corruption in a percentage of cases, and it may even result in data loss. The user manual can describe that an external disk should always be unmounted before it will be disconnected, which is good as a countermeasure against legal claims, but it will not avoid that users disconnect mounted disks.

As a further remark, the current USB and Firewire specifications do not allow to use a hardware solution for the unmount problem. For instance, it is supposed that the residential gateway 13 has a hardware unmount button close to the USB and Firewire interfaces, and a status LED indicates when it is safe to disconnect the disk. Such a hardware implementation will only work when only one disk is connected to the interface of the residential gateway 13. But since USB and Firewire are bus interfaces, multiple disks can be connected to the interface by making use of a hub. Thus, when using a hub, selective unmounting is not possible with such a hardware implementation, because either all disks will be unmounted at once, or no disk will be unmounted at all.

External, respectively portable storage devices are also used with personal computers and laptops. Unmounting a storage device makes it inaccessible by the computer. In order for a storage device to be unmounted, it must first be mounted. Mounting takes place before a computer can use the respective storage device and is done automatically in accordance with the "Plug and Play" architecture. When a storage disk is mounted, it is active and the computer can access its contents. Since unmounting a disk prevents the computer from accessing it, there is no risk of the disk being disconnected in the middle of a data transfer. Therefore, before removing an external storage device, such as a USB flash drive or a USB hard disk, the storage device should be unmounted to avoid possible data corruption.

Several types of storage devices can be unmounted, including external hard drives, USB flash drives, iPods, flash memory cards, and disk images. In order to unmount a disk in the Microsoft Windows operating system, the following steps are necessary: opening "My Computer," selecting the disk, and clicking the "Eject this disk" option in the left sidebar. In the Apple Mac OS X operating system, the following steps are necessary: selecting the disk on the desktop and either drag the disk to the trash, which changes to an Eject icon, or selecting "File→Eject" from the Finder's menu bar. Once a removable disk has been unmounted, it can safely be disconnected from the computer.

U.S. Pat. No. 7,234,014 describes a portable storage device including a body, an actuator and an indicator. When the storage device is coupled to a host device, an unmount operation can be performed by a user by depressing the actuator, which causes an interrupt message to be send to the host device for initiating shut-down of the portable storage device by removing it from a host device list of available storage media, and which depowers the portable storage device. After the unmount operation, the indicator then changes to signify that it is safe now to remove the portable storage device from the host device.

U.S. 2006/0200570 describes a method for mounting network file systems to a client arrangement via a peer-to-peer local area network, which uses a network file protocol being compatible with the client arrangement. A network file system can be unmounted by using the compatible network file protocol in response to a signal for disconnecting the client arrangement from the peer-to-peer local area network.

SUMMARY OF THE INVENTION

The invention defines a method for operating a Universal Plug and Play AV system, which comprises a server device including a media server, a display device including a media renderer and a control device including a control point for controlling the server device and the display device via Universal Plug and Play AV actions. The server device comprises a digital interface for coupling with a removable storage device, and the control device comprises a user interface with a display for displaying a list of media files stored on the storage device. The method comprises the steps of arranging an unmount icon in the display of the control device and unmounting the storage device in case said unmount icon is operated. The unmount icon is displayed in particular in a container or directory of the control device, in which the media files of the storage device are displayed, and is associated with an action on the media server which performs the unmount operation of the storage device. The container or directory is provided by the media server, which arranges advantageously automatically the unmount icon in the container or directory, when a storage device is coupled to the digital interface and mounted.

In a further aspect of the invention, the unmount icon is displayed in a root container or root directory, which includes the containers or directories of the media files. In particular, a device-specific unmount icon is provided in the display of the control device for each storage device being coupled to the digital interface, and the storage device specific unmount icon is removed from the display, when an unmount operation for a respective storage disk is finished. Advantageously, all unmount icons are arranged in the same container or directory of the control device.

The invention relates further to a system comprising a server device having a digital interface, to which a removable storage device is coupled, a display device, and a control device including a control point for operating the server device and the display device, the control device comprising a user interface with a display for displaying a list of media files stored in the storage device, for utilizing the method. The digital interface is in particular a USB interface, a Firewire interface or a smart card interface, and the system is in a preferred embodiment a UPnP AV system.

The invention defines further a control device utilizing the method. The server device is for example a residential gateway or a set-top box, the control device a smartphone, a tablet PC or a remote control, and the display device a smart TV or a computer monitor.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

The method according to the present invention for operating an UPnP AV system, in particular the UPnP AV system as described with regard to FIGS. 2 and 3, involves a few essential changes of the media server implementation as included for example in a residential gateway. The Universal Plug and Play AV system comprises a media server, a media renderer and a control point for operating the media server and the media renderer, wherein the control point controls the media server via Universal Plug and Play AV actions, as defined for example in the current UPnP AV V2 standard or any further UPnP AV standard. The media server comprises in particular a digital interface to which a removable storage device is coupled, and includes dedicated executable files, which let a user trigger an unmount operation easily via the control point. When the user triggers the unmount action of the storage device for performing the unmount operation, the storage device will be unmounted and he will be informed when it is save to disconnect the storage device via a message displayed on the control point and/or the media renderer. For example, an unmount icon is arranged in the display of the display device for each storage device coupled to the server device and each unmount icon is linked with the respective executable file for performing the unmount operation of a storage device, which the user wants to remove.

The unmount icons of the executable files contain advantageously storage device specific information on the display and when an unmount operation is triggered by a user, an information is presented for the user, indicating when it is safe to unmount the respective storage device. This information can be static, i.e. a fixed image, or can be generated on the fly such that it contains storage device specific information, e.g. a recorded voice informing the user about the volume name of the storage device that has been unmounted.

The filename of the executable file as shown in the display of the control point may be displayed for example in addition on the display of the display device, and/or of the control device, when the unmount action of the respective storage device has finished. The executable files contain corresponding metadata to allow annotating each executable file with the respective information.

Figure 4:
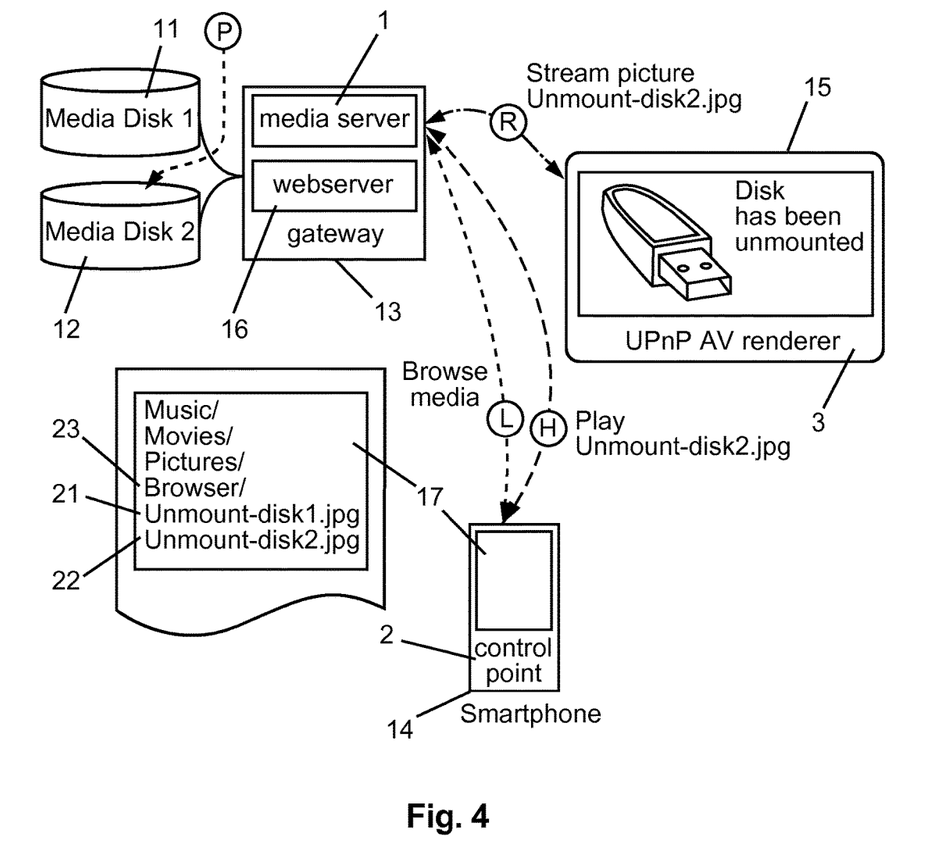

A preferred embodiment of the invention is described now with regard to FIG. 4, which shows a media server 1, a control point 2 and a media renderer 3, as described with regard to FIGS. 1-3. The media server 1 is in this embodiment included in a residential gateway 13, to which a first and a second removable and portable storage device, storage disks 11, 12, are connected. The control point 2 is implemented in a smartphone 14 or any other remote control, and the media renderer 3 is implemented in a television set 15. The storage disks 11, 12 are in particular coupled via an USB or a Firewire bus to the residential gateway 13 and therefore to the media server 1. The storage disks 11, 12 are e.g. hard disks or flash memory storage devices and comprise audio and video files, photos and other data files.

The media files may be organized in a hierarchy of file containers, which are arranged for example in a root container or a root directory of the media server 1 and can be displayed in a display 17 of the smartphone 14, as described already with regard to FIGS. 2 and 3. By using the software of the control point 2 as included in the smartphone 14, a user can open a file container "Music" or "Pictures" and stream respective audio or video files from the storage disks 11, 12 via the media server 1 to the media renderer 3 for playback.

The smartphone 14 comprises a user interface providing in the display 17 a multitude of smartphone applications and the root container with the file containers, in which the music files, movie files, pictures and other data are listed, and which comprises a browse function 23. In particular, the music files are arranged within a music container, the movie files within a movie container, and the pictures within a picture container. In addition, an unmount icon 21 is arranged in the root container for unmounting the storage disk 11 and an unmount icon 22 for unmounting the storage disk 12, when the root container is opened in the display 17 of the smartphone 14. The unmount icons 21, 22 are e.g. displayed as images in the display 17, which can be selected by moving a cursor to an image by means of the buttons of the smartphone 14 and by pushing a respective select button, or by touching the image with a finger in case the display 17 includes a touchscreen.

When a user wants to hear music or to see a video file with the UPnP AV system, he switches on the smartphone 14, television set 15 and gateway 13, if not already in operation, and selects and opens on the smartphone the root container in the display 17 for opening the music, movie and picture containers, for a display of the media files on the display 17 of the smartphone 14. He uses e.g. the browse function 23 for locating a favourite movie in the movie directory, and when the user has selected that video with the browse function 23, the smartphone 14 forwards a respective play command to the media server 1 of the residential gateway 13, e.g. via a WiFi connection. Then, the media server 1 locates the requested video in one of the storage disks 11, 12 and streams the video to the television set 15 for a playback of the video.

When a user wants to disconnect one of the storage devices 11, 12, e.g. storage device 12, the user has to unmount the storage device 12. The user opens therefore the root container of the smartphone 14, in which the unmount icon 21 for storage device 11 and unmount icon 22 for storage device 12 are each displayed as a picture, step K. In a further step L, the user selects the unmount icon 21 by using the control elements of the smartphone 14, the control buttons or by simply touching the unmount icon 21 in case of a touch sensitive display, to start the unmount operation for the storage device 12. When the unmount icon 21 is triggered, step M, the smartphone sends a respective unmount request to the media server 1 of the residential gateway 13, step O. The storage device 12 is then logically removed from the media server 1, step P. When the unmount operation has terminated, an image of the storage device 2 or any other storage device specific information is displayed for example on the media renderer 3, the television set 15, and/or in addition any text or an auto information is displayed for informing that the storage device 12 has been unmounted and that it is save now to remove storage device 12, step R. Alternatively or in addition, the information that the storage device can be safely removed is displayed on the display 17 of the control point 2, smartphone 14. In a further step S, the unmount icon 21 disappears from the display 17, when the unmount operation for the storage disk 12 has been finished by the media server 1.

When the user connects the storage device 12 again at a later time to the digital interface of the gateway 13, the media server 1 mounts the storage device 12 for the UPnP Av system and arranges the unmount icon 22 again in the root container of the media server 1. Correspondingly, the unmount icon 22 is displayed again in the display 17 of the smartphone 14, when the root container is opened in the display 17.

The method as described is fully compliant to the UPnP AV specification. Although the method will not avoid disconnecting of a mounted disk, which is an inherent flaw is the USB specification, it will provide a convenient and easily visible method to trigger the unmount action also for inexperienced users. Since unmounting requires user interaction, manufacturers of media servers are obliged to make the unmount process as user friendly as possible. The method as described discloses and allows therefore manufacturers to provide a user friendly unmount method for UPnP AV media servers.

The unmount icons 21, 22 are advantageously arranged together with movie, music and picture directories, representing media file directories, in a root directory of the smartphone 14, so that the user is always aware, where the unmount buttons for the storage devices are located. The file directories can be understood also as file containers, and the root directory as a root container.

The method as described with regard to FIG. 4 is not only applicable to a three box system, as described with regard to FIG. 4, but may be used also for any two box system or even a one box system as defined by the UPnP AV specification.

For example, the media server 1 and the media renderer 2 may be included within one device, e.g. a television set comprising an USB interface, to which one or several USB hard disks or any other USB storage devices can be connected. The user can browse then with the control point 2, included e.g. in any smartphone or a remote control of the television set, through the audio files, video files and pictures as included in the storage device connected to the television set. An unmounting of this storage device can be performed correspondingly in accordance with the method as described with regard to FIG. 4.

In another embodiment, the UPnP AV system comprises a residential gateway or a set-top box including a media server and a webserver, and the control point function and the media renderer are implemented within an E-book, an I-Pad or any other smart device. The method describes therefore a generically applicable method, via which a user can easily unmount a storage device coupled to a media server within an UPnP system, in particular an UPnP AV system, to avoid that a user disconnects for ease a mounted storage device.

Also other embodiments of the invention may be utilized by one skilled in the art without departing from the scope of the present invention. The invention resides therefore in the claims herein after appended.

The invention claimed is:

1. A method for operating a Universal Plug and Play audio/video system comprising:
a media server to which at least one removable storage device is coupled through a digital interface comprised in the media server,
a media renderer included in a display device, and
a control point included in a control device for controlling the media server and the media renderer, the control device comprising a user interface with a display for displaying a list of media files stored in the at least one removable storage device and providing defined actions for rendering pictures, music and videos via Universal Plug and Play audio/video actions; comprising:
unmounting the removable storage device upon reception of at least an unmount request, the transmission of said unmount request being triggered by operating an unmount icon displayed together with picture, music and video directories in a root directory on the display of the control device,
and
providing a feedback on the display device and/or the control device after said unmount action was performed on the media server.

2. The method of claim 1, comprising:
providing the unmount icon in said display when said at least one removable storage device is coupled to the digital interface and mounted, and
removing said unmount icon from the display, when the unmount operation for the at least one removable storage device is finished.

3. The method of claim 1, further comprising providing a device-specific unmount icon in the display of the control device for each removable storage device being coupled to the digital interface, and removing the device specific unmount icon from the display, when an unmount operation for said specific removable storage device is finished.

4. The method of claim 3, further comprising displaying all unmount icons in the same container or directory of the control device.

5. The method of claim 3, wherein each unmount icon is linked with an executable file stored on the media server, for performing the unmount operation of a respective removable storage device.

6. The method of 1, further comprising sending after the unmount operation an information to the control device and/or the media renderer to inform the user that it is now safe to unplug the at least one removable storage device.

7. The method of claim 1, wherein the digital interface is a USB interface, a Firewire interface or a smart card interface.

8. A system comprising:
a media server to which at least one removable storage device is coupled,
a media renderer included in a display device, and
a control point included in a control device for operating the media server and the display device, the control device comprising a user interface with a display for displaying a list of media files stored in the at least one removable storage device and providing defined actions for rendering pictures, music and videos via Universal Plug and Play audio/video actions, wherein
the control point is configured to arrange and display an unmount icon together with picture, music and video directories in a root directory on the display of the control device,
the at least one removable storage device is unmounted when said unmount icon is operated, and
a feedback is provided on the display device and/or the control device after said unmount action was performed on the media server.

9. A control device, comprising: a control point for controlling a media server and a display device including a media renderer, the control device being configured for controlling the media server and the media renderer and comprising a user interface with a display for displaying a list of media files stored in at least one removable storage device coupled to the media server and being configured for providing defined actions for rendering pictures, music and videos via Universal Plug and Play audio/video actions, wherein     the control device is configured to arrange and display an unmount icon together with picture, music and video directories in a root directory of the control device on the display of the control device, and when said unmount icon is operated, unmounting the at least one removable storage device and providing a feedback on the media device and/or the control device after said unmount action was performed on the media server.

* * * * *